(12) United States Patent
Kim et al.

(10) Patent No.: US 9,994,475 B2
(45) Date of Patent: Jun. 12, 2018

(54) GLASS MOLDING APPARATUS

(71) Applicant: SAMSUNG DISPLAY CO., LTD., Yongin-si, Gyeonggi-do (KR)

(72) Inventors: Minsoo Kim, Seoul (KR); Mugyeom Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days. days.

(21) Appl. No.: 15/154,844

(22) Filed: May 13, 2016

(65) Prior Publication Data
US 2017/0022086 A1 Jan. 26, 2017

(30) Foreign Application Priority Data

Jul. 23, 2015 (KR) ........................ 10-2015-0104575

(51) Int. Cl.
| C03B 23/03 | (2006.01) |
| C03B 35/14 | (2006.01) |
| C03B 35/20 | (2006.01) |
| C03B 40/00 | (2006.01) |
| C03B 23/031 | (2006.01) |

(52) U.S. Cl.
CPC .......... *C03B 23/0302* (2013.01); *C03B 23/03* (2013.01); *C03B 23/031* (2013.01); *C03B 23/0305* (2013.01); *C03B 23/0307* (2013.01); *C03B 35/14* (2013.01); *C03B 35/202* (2013.01); *C03B 40/00* (2013.01)

(58) Field of Classification Search
None
See application file for complete search history.

(56) References Cited

U.S. PATENT DOCUMENTS

| 4,104,845 A | * | 8/1978 | Hoffmann | B67B 5/032 |
| | | | | 53/297 |
| 5,087,279 A | * | 2/1992 | Monji | C03B 11/08 |
| | | | | 65/32.1 |
| 5,171,347 A | * | 12/1992 | Monji | C03B 11/08 |
| | | | | 264/2.7 |
| 5,616,161 A | * | 4/1997 | Morikita | C03B 11/08 |
| | | | | 425/407 |
| 5,981,920 A | * | 11/1999 | Kelly | H05B 3/44 |
| | | | | 219/544 |
| 7,412,849 B2 | * | 8/2008 | Bonitz | C03B 7/14 |
| | | | | 65/207 |

(Continued)

FOREIGN PATENT DOCUMENTS

| JP | 2005-263585 A | 9/2005 |
| JP | 2009-221042 A | 10/2009 |

(Continued)

*Primary Examiner* — Jodi C Franklin
(74) *Attorney, Agent, or Firm* — Lewis Roca Rothgerber Christie LLP

(57) ABSTRACT

A glass molding apparatus includes at least one molding part including a molding cast configured to mold a glass, a transfer roller part including a plurality of transfer rollers below the molding part, the transfer rollers being arranged along a first direction, being configured to rotate in a first rotation direction to transfer the molding part along the first direction, and being configured to apply heat to the molding part, and a plurality of pressure parts configured to apply pressure to the molding part.

19 Claims, 14 Drawing Sheets

(56) References Cited

U.S. PATENT DOCUMENTS

| | | | | |
|---|---|---|---|---|
| 8,006,743 | B2* | 8/2011 | Weyer | B22D 11/16 |
| | | | | 164/154.1 |
| 2002/0035854 | A1* | 3/2002 | Herzbach | B29C 59/02 |
| | | | | 65/81 |
| 2002/0060377 | A1* | 5/2002 | Uotani | B29C 33/0055 |
| | | | | 264/2.5 |
| 2004/0026066 | A1* | 2/2004 | Rahmfeld | B22D 11/1206 |
| | | | | 164/452 |
| 2005/0178157 | A1* | 8/2005 | Yoneda | C03B 11/005 |
| | | | | 65/32.1 |
| 2006/0059951 | A1* | 3/2006 | Yoon | C03B 11/082 |
| | | | | 65/138 |
| 2011/0038975 | A1* | 2/2011 | Park | G02B 6/0035 |
| | | | | 425/143 |
| 2012/0094079 | A1* | 4/2012 | Gabel | C03B 29/08 |
| | | | | 428/157 |
| 2013/0086948 | A1 | 4/2013 | Bisson et al. | |
| 2014/0150498 | A1* | 6/2014 | D'ovidio | C03B 11/122 |
| | | | | 65/29.1 |
| 2014/0367027 | A1* | 12/2014 | Roh | C03B 23/0302 |
| | | | | 156/99 |
| 2017/0001896 | A1* | 1/2017 | Nakaya | C03B 11/086 |
| 2017/0120501 | A1* | 5/2017 | Jeon | B29C 51/082 |

FOREIGN PATENT DOCUMENTS

| | | |
|---|---|---|
| KR | 10-2006-0129848 A | 12/2006 |
| KR | 10-1206328 B1 | 12/2012 |
| KR | 10-1404494 B1 | 6/2014 |
| KR | 10-2014-0086712 A | 7/2014 |

* cited by examiner

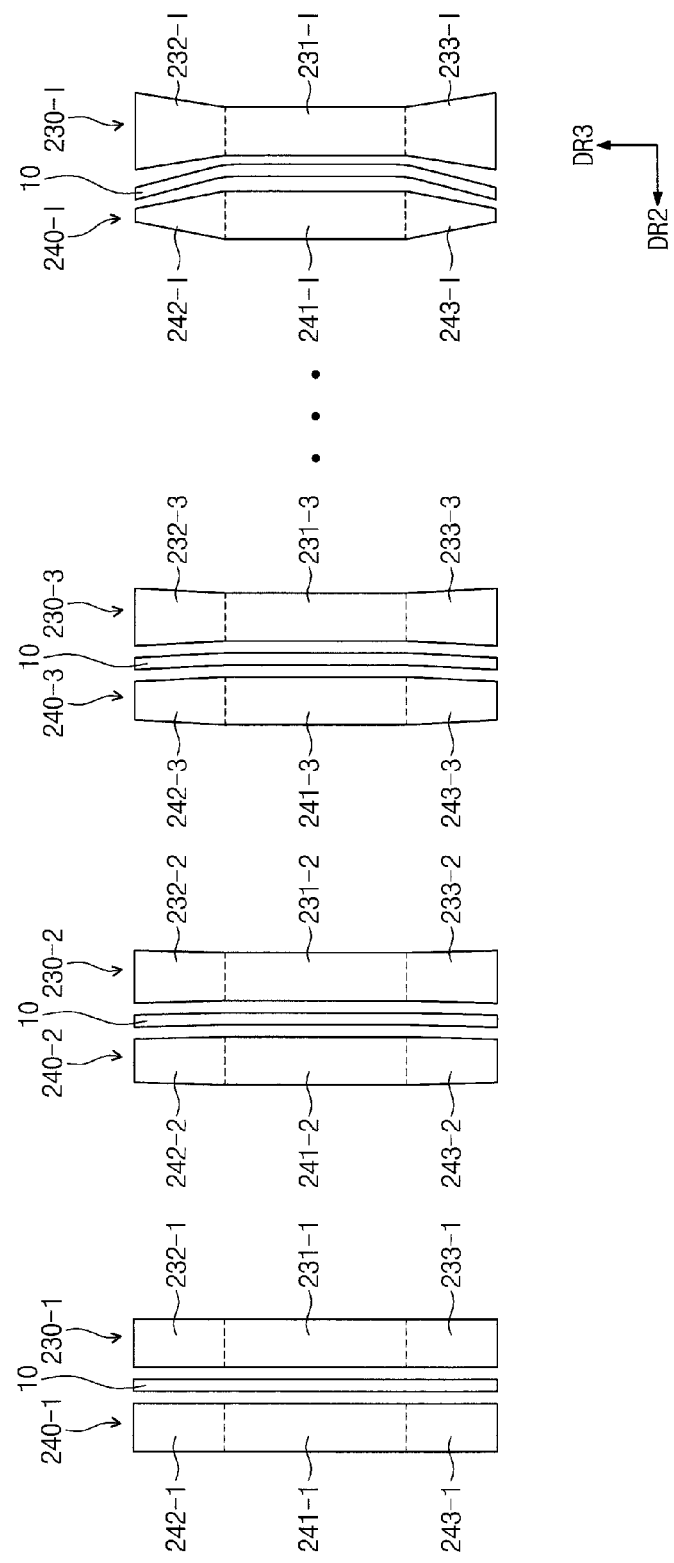

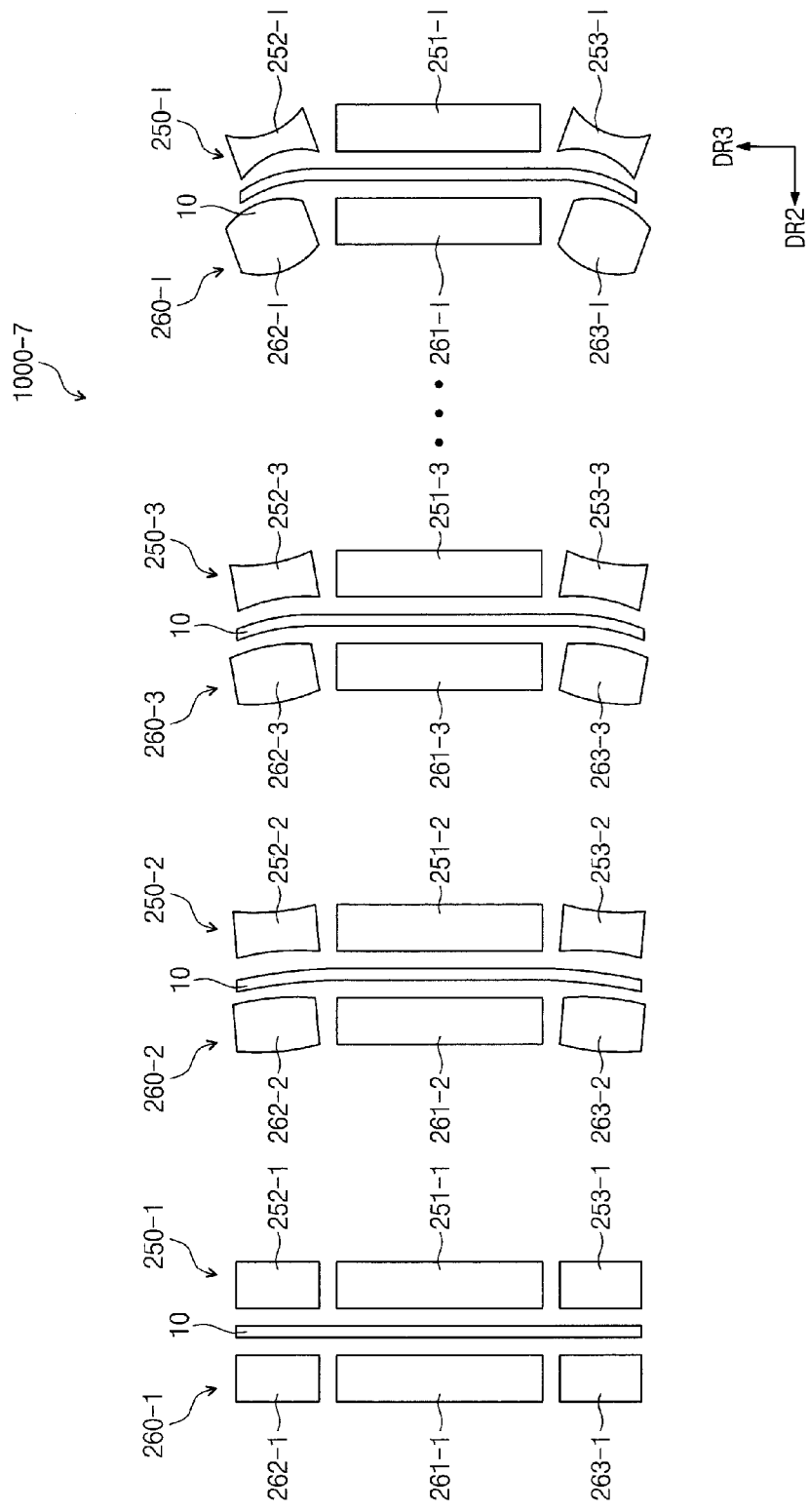

GLASS MOLDING APPARATUS

CROSS-REFERENCE TO RELATED APPLICATION

This U.S. non-provisional patent application claims priority to, and the benefit of, Korean Patent Application No. 10-2015-0104575, filed on Jul. 23, 2015 in the Korean Intellectual Property Office, the contents of which are hereby incorporated by reference in their entirety.

BACKGROUND

1. Field of Disclosure

The present disclosure relates to a glass molding apparatus.

2. Description of the Related Art

In general, a mobile display device displays an image using a display panel mounted on a front surface thereof. A glass on the display panel serves as a cover to protect the display panel from external impacts, and to prevent moisture from entering the display panel.

The glass is at an uppermost position of the mobile display device, and thus a user directly contacts the glass. In recent years, glasses with various designs are mass manufactured in accordance with development of mobile display devices with various designs.

SUMMARY

Embodiments of the present disclosure provide a glass molding apparatus capable of reducing an overall size of equipment, and capable of simplifying a molding process.

According to one or more exemplary embodiments of the present invention, a glass molding apparatus includes at least one molding part including a molding cast configured to mold a glass, a transfer roller part including a plurality of transfer rollers below the molding part, the transfer rollers being arranged along a first direction, being configured to rotate in a first rotation direction to transfer the molding part along the first direction, and being configured to apply heat to the molding part, and a plurality of pressure parts configured to apply pressure to the molding part.

Each of the transfer rollers may include a first heating member including a coil and a power supply part connected to the coil.

A temperature of the heat applied to the molding part by a respective one of the transfer rollers may increase along the first direction.

An intensity of the pressure applied to the molding part by a respective one of the pressure parts may increase along the first direction.

The molding cast may include an upper molding cast configured to contact an upper portion of the glass and a lower molding cast configured to contact a lower portion of the glass, and the molding case may be configured to produce glass in a molded configuration that may include a plane surface portion and a curved surface portion at an end of the plane surface portion along the first direction.

The molding part may be configured to be sequentially transferred to regions respectively corresponding to the pressure parts along the first direction, and the pressure parts may be configured to move along a second direction to apply pressure to the molding part, the second direction being substantially perpendicular to the first direction.

Each of the pressure parts may be configured to apply heat to the molding part.

The glass molding apparatus may further include a heating block between the pressure parts and the molding part, the heating block being configured to apply heat to the molding part.

The pressure parts may include a plurality of pressure rollers arranged along the first direction, the pressure rollers facing the transfer rollers such that the molding part is located between the transfer rollers and the pressure rollers, being configured to rotate in a second rotation direction opposite to the first rotation direction, and being configured to transfer the molding part along the first direction and to concurrently apply pressure to the molding part along a second direction substantially perpendicular to the first direction. A distance between respective ones of the pressure rollers and the transfer rollers may decrease in the first direction, and the transfer rollers may be configured to transfer the molding part along the first direction.

The pressure parts may include a plurality of pressure rollers arranged along the first direction, the pressure rollers facing the transfer rollers such that the molding part is located between the transfer rollers and the pressure rollers, being configured to rotate in a second rotation direction opposite to the first rotation direction, and being configured to transfer the molding part along the first direction and to concurrently apply pressure to the molding part along a second direction substantially perpendicular to the first direction. Radiuses of respective ones of the pressure rollers may increase in the first direction, and the transfer rollers may be configured to transfer the molding part along the first direction.

The pressure rollers may be configured to apply pressure to the molding part at increasing intensity as the molding part is transferred along the first direction.

Each of the pressure rollers may include a second heating member configured to apply heat to the molding part.

The transfer rollers and the pressure roller may be configured to apply heat to the molding part at increasing temperatures along the first direction.

According to one or more embodiments of the present invention, a glass molding apparatus includes an upper surface molding part including a plurality of upper surface molding rollers configured to contact an upper surface of a glass, the upper surface molding rollers being arranged along a first direction, and a lower surface molding part including a plurality of lower surface molding rollers configured to contact a lower surface of the glass, the lower surface molding rollers being arranged along the first direction and facing the upper surface molding part along a second direction that is substantially perpendicular to the first direction. The upper surface molding rollers are configured to rotate in a first rotation direction and the lower surface molding rollers are configured to rotate in a second rotation direction opposite to the first rotation direction, to transfer the glass along the first direction, each of the upper surface molding rollers and each of the lower surface molding rollers includes a heating member configured to generate heat, and the upper surface molding rollers and the lower surface molding rollers are respectively configured to generate heat at increasing temperatures in the first direction.

Each of the upper surface molding rollers may include a first plane surface molding part extending along a third direction that is substantially perpendicular to the first and second directions, and a first curved surface molding part at an end of the first plane surface molding part, and each of the lower surface molding rollers may include a second plane surface molding part extending along the third direction and a second curved surface molding part at an end of the second plane surface molding part. Radiuses of respective ones of the first curved surface molding parts may increase in the first direction, and radiuses of respective ones of the second curved surface molding part may decrease in the first direction.

The respective radiuses of each of the first curved surface molding parts of the upper surface molding rollers may gradually increase toward an end of the upper surface molding rollers, and respective radiuses of each of the second curved surface molding parts of the lower surface molding rollers may gradually decrease toward an end of the lower surface molding rollers.

The first curved surface molding part may have a concavely curved surface and the second curved surface molding part may have a convexly curved surface.

Each of the upper surface molding rollers may include a first roller extending along a third direction that is substantially perpendicular to the first and second directions, and a second roller at an end of the first roller. Each of the lower surface molding rollers may include a third roller extending in the third direction, and a fourth roller at an end of the third roller. A slope of a rotation axis of respective ones of the second and fourth rollers may increase in the first direction.

The second roller may have a concavely curved surface, and the fourth roller may have a convexly curved surface.

According to one or more exemplary embodiments of the present invention, a glass molding apparatus includes a molding part configured to mold an upper surface and a lower surface of a glass, a supporting part contacting at least two surfaces of the molding part and supporting the molding part, and a pressure part configured to apply pressure to the molding part along a first direction. The molding part includes an upper surface molding cast configured to contact the upper surface of the glass along the first direction and a lower surface molding cast configured to contact the lower surface of the glass along the first direction and surrounding a side portion of the upper surface molding cast. The side portion of the upper surface molding cast contacts a side surface of the lower surface molding cast and is configured to travel along the first direction.

Accordingly, the overall size of the glass molding apparatus may be significantly reduced, and the molding process may be simplified. In addition, the glass molding apparatus may easily form the curved surface of the glass.

BRIEF DESCRIPTION OF THE DRAWINGS

The above and other aspects of the present disclosure will become more readily apparent by reference to the following detailed description when considered in conjunction with the accompanying drawings, wherein:

FIG. 5B is a side view showing portions of the glass molding apparatus shown in FIG. 4;

FIG. 9 is a side view showing portions of a glass molding apparatus according to one or more exemplary embodiments of the present disclosure;

DETAILED DESCRIPTION

Figure 1A:
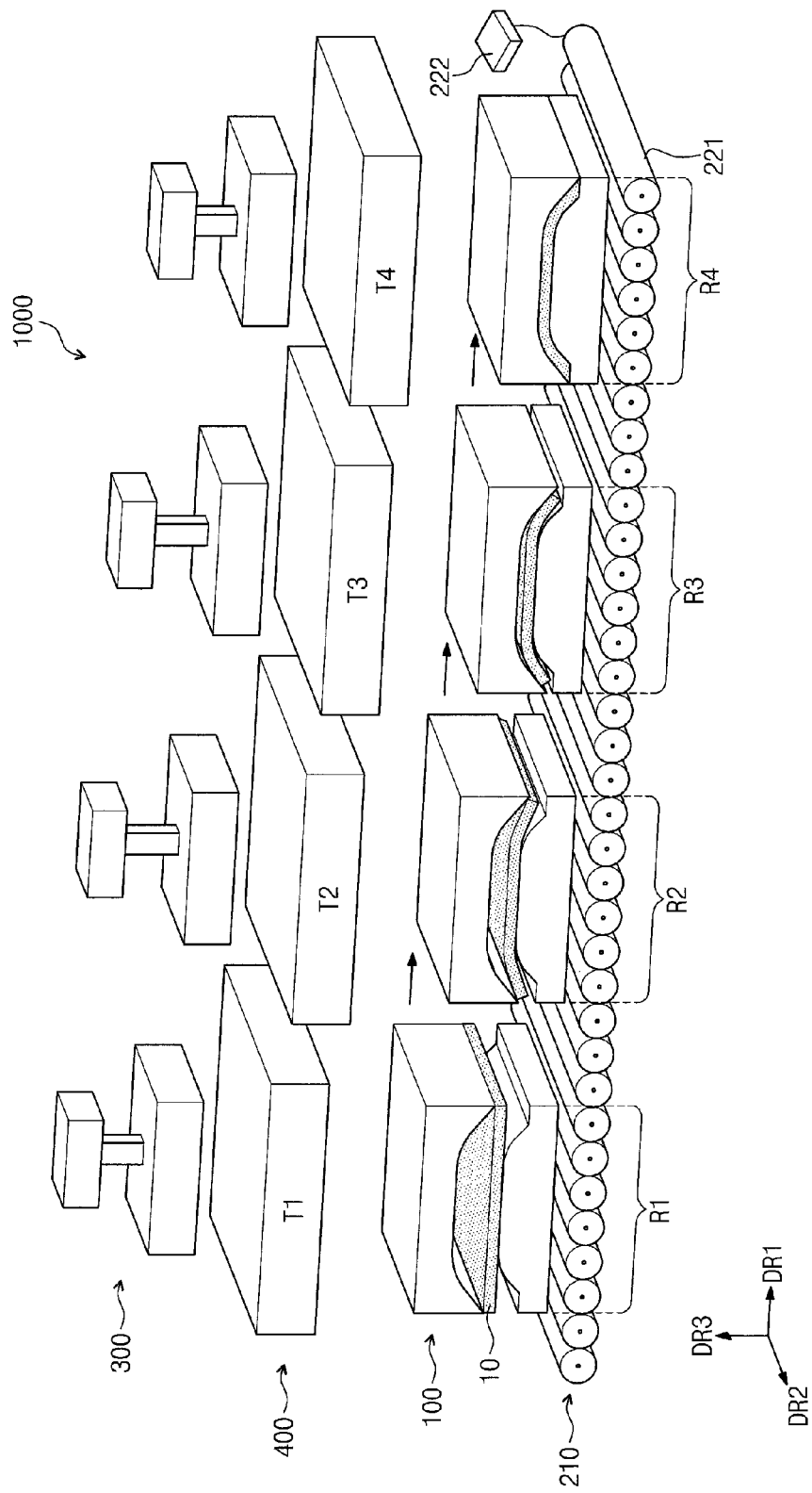
FIG. 1A is a perspective view showing a glass molding apparatus according to one or more exemplary embodiments of the present disclosure.

Hereinafter, example embodiments are described in more detail with reference to the accompanying drawings, in which like reference numbers refer to like elements throughout. The present invention, however, may be embodied in various different forms, and should not be construed as being limited to the illustrated embodiments described herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that when an element or layer is referred to as being "on", "connected to" or "coupled to" another element or layer, it can be directly on, connected to or coupled to the other element or layer, or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention are described with reference to the accompanying drawings.

Figure 1B:
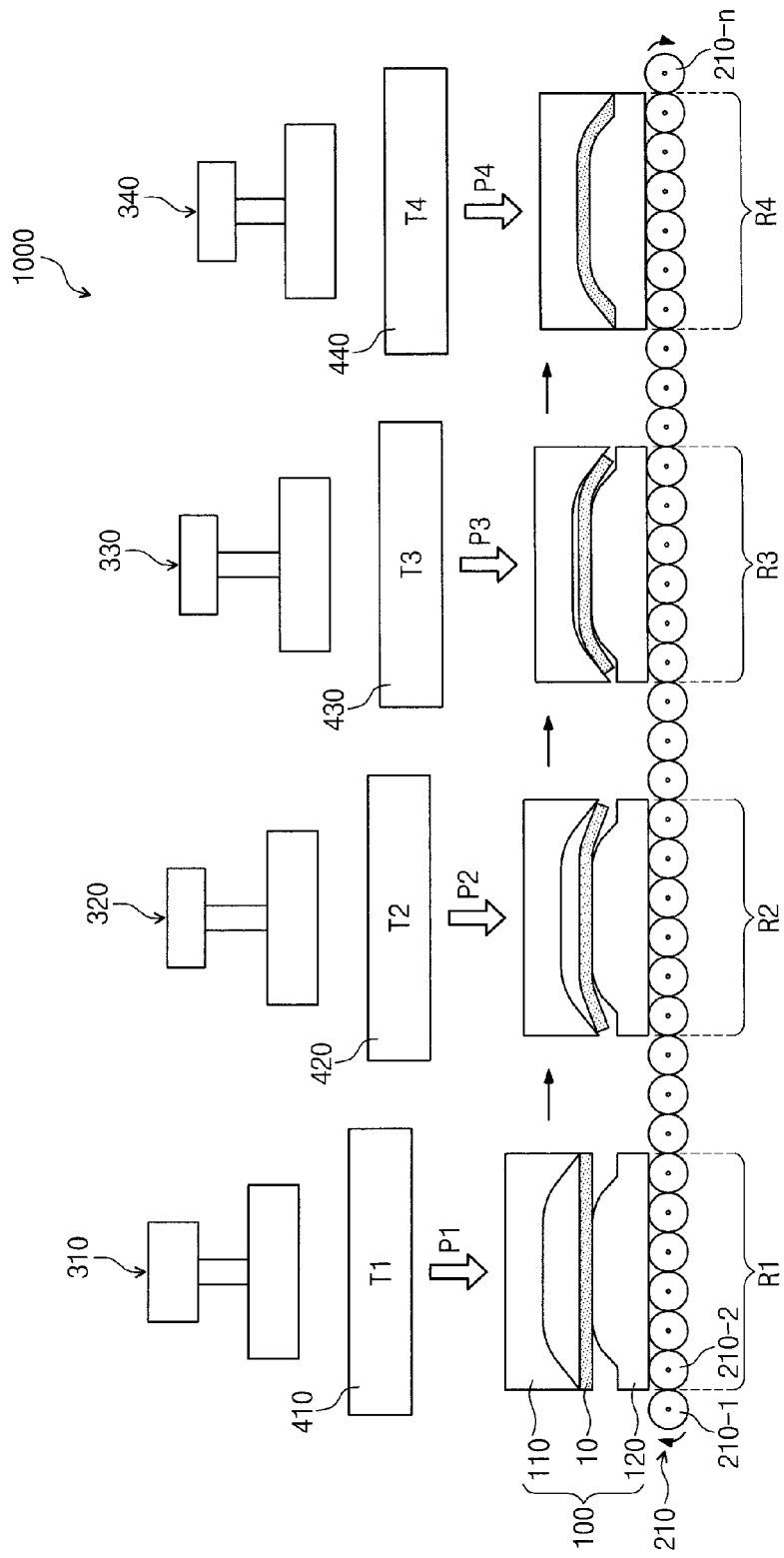
FIG. 1B is a front side view showing the glass molding apparatus shown in FIG. 1A.

FIG. 1A is a perspective view showing a glass molding apparatus 1000 according to one or more exemplary embodiments of the present disclosure, and FIG. 1B is a front side view showing the glass molding apparatus 1000 shown in FIG. 1A.

Referring to FIGS. 1A and 1B, the glass molding apparatus 1000 according to one or more exemplary embodiments includes at least one molding part 100, a transfer roller part 210, and a plurality of pressure parts 300.

The molding part 100 includes a molding cast having a shape that corresponds to a shape of a molded glass 10. For example, the molding part 100 (e.g., the molding cast) may include a curved portion that contacts the glass 10.

The molding part 100 includes a first molding cast (e.g., an upper molding cast) 110 and a second molding cast (e.g., a lower molding cast 120). The molding part 100 may include a metal mold. In more detail, the upper molding cast 110 may be an upper metal mold, and the lower molding cast 120 may be a lower metal mold.

The molding part 100 may include a metal material, but the present invention is not limited thereto or thereby. For example, the molding part 100 may include various materials, e.g., ceramic, silicon carbide (SiC), tungsten carbide (WC), etc.

The glass 10 is disposed between the upper molding cast 110 and the lower molding cast 120, and is molded by the upper molding cast 110 and the lower molding cast 120. In more detail, an upper surface of the glass 10 contacts a lower surface of the upper molding cast 110, and a lower surface of the glass 10 contacts an upper surface of the lower molding cast 120.

The transfer roller part 210 is disposed under the molding part 100. The transfer roller part 210 includes a plurality of transfer rollers 210-1 to 210-$n$. In some exemplary embodiments, the transfer rollers 210-1 to 210-$n$ include carbon. In other embodiments, the transfer rollers 210-1 to 210-$n$ may include metal.

The transfer rollers 210-1 to 210-$n$ are arranged along a first direction DR1. Each of the transfer rollers 210-1 to 210-$n$ extends in a second direction DR2, which crosses (or is perpendicular to) the first direction DR1.

Each of the transfer rollers 210-1 to 210-$n$ may rotate (e.g., may rotate in a predetermined direction). For example, in some embodiments, each of the transfer rollers 210-1 to 210-$n$ rotates in a clockwise direction, and the molding part 100 disposed above the transfer roller part 210 is transferred along the first direction DR1.

In some exemplary embodiments, the glass molding apparatus 1000 includes a plurality of molding parts 100. As such, the molding parts 100 are disposed on the transfer roller part 210 to correspond to the pressure parts 300 in a one-to-one correspondence.

The transfer roller part 210 applies heat to the molding part 100 (e.g., applies heat at a predetermined temperature). When heat is applied to the molding part 100, the glass 10 disposed inside the molding part 100 may be easily heated.

For example, each of the transfer rollers 210-1 to 210-$n$ may include a first heating member 221. According to some exemplary embodiments, the first heating member 221 may include a coil disposed in each of the transfer rollers 210-1 to 210-$n$, but the present invention is not limited thereto. The coil is electrically connected to a first power supply part 222. Accordingly, an electrical energy generated by the first power supply part 222 is converted to heat energy, and the heat energy is applied to the first heating member 221, and thus the transfer rollers 210-1 to 210-$n$ are heated by the heat energy applied to the first heating member 221. The heat energy generated by the heated transfer rollers 210-1 to 210-$n$ is applied to the molding part 100, and then the molding part 100 is heated.

FIG. 1A shows the transfer roller part 210 heated by the first heating member 221, but the present invention is not limited thereto or thereby. For example, the transfer roller part 210 may be heated through various ways, as the transfer roller part 210 may be induction-heated by external heat energy.

The transfer rollers 210-1 to 210-$n$ may have a surface temperature according to (or in corresponding with) positions at which the transfer rollers 210-1 to 210-$n$ are arranged.

In more detail, the transfer roller part 210 includes first, second, third, and fourth regions R1, R2, R3, and R4, and the surface temperature of the transfer rollers 210-1 to 210-$n$ increases in order from the first region R1 to the fourth region R4.

For example, each of the transfer rollers 210-1 to 210-$n$ in the first region R1 is heated at a first temperature T1, and each of the transfer rollers 210-1 to 210-$n$ in the second region R2 is heated at a second temperature T2 that is higher than the first temperature T1. Each of the transfer rollers 210-1 to 210-$n$ in the third region R3 is heated at a third temperature T3 that is higher than the second temperature T2, and each of the transfer rollers 210-1 to 210-$n$ in the fourth region R4 is heated at a fourth temperature T4 that is higher than the third temperature T3.

According to one or more exemplary embodiments of the present invention, the transfer rollers 210-1 to 210-$n$ in each of the first to fourth regions R1 to R4 may be heated at the same temperatures T1 to T4, but the present invention is not limited thereto or thereby. For example, the heated temperature of the transfer rollers 210-1 to 210-$n$ may be sequentially increased in accordance with the arrangement order of the transfer rollers 210-1 to 210-$n$ arranged in the first direction DR1 regardless of the regions R1 to R4.

Figure 2:
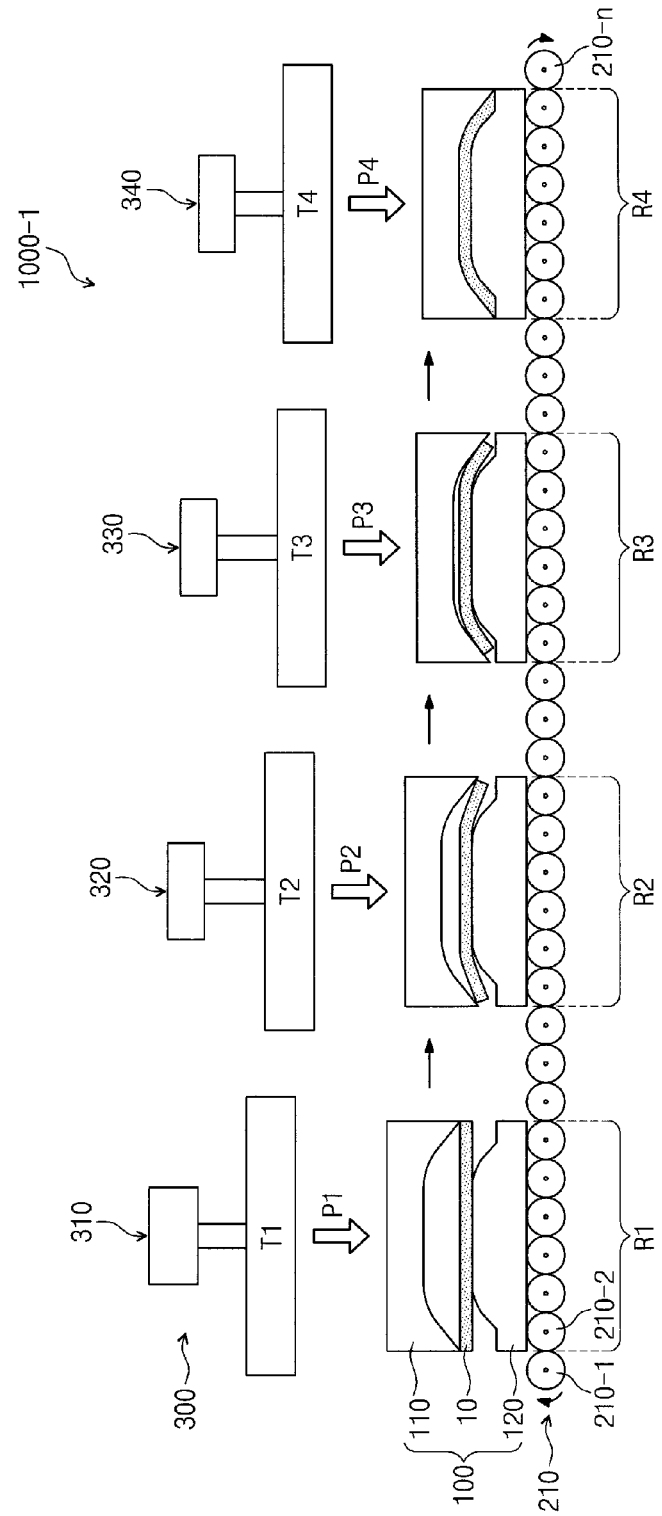
FIG. 2 is a front side view showing a glass molding apparatus according to one or more exemplary embodiments of the present disclosure.

The pressure parts 300 are disposed on the molding part 100. The pressure parts 300 are arranged along the first direction DR1. For example, as illustrated in FIGS. 1A, 1B, and 2, first, second, third, and fourth pressure parts 310, 320, 330, and 340 may be arranged along the first direction DR1.

The pressure parts 300 may be spaced apart from each other. In more detail, the first to fourth pressure parts 310 to 340 respectively correspond to the first to fourth regions R1 to R4.

The pressure parts 300 pressurize (e.g., apply pressure to, or downwardly apply pressure to) the molding part 100 along a third direction DR3 (e.g., along a vertical direction), which is substantially perpendicular to the first and second directions DR1 and DR2.

In more detail, when the molding part 100 is disposed in any one region of the first to fourth regions R1 to R4, a pressure part among the first to fourth pressure parts 310 to 340, which corresponds to the region in which the molding part 100 is disposed, moves along the third direction DR3 to pressurize the molding part 100.

As described above, because the molding part 100 is heated at a temperature that increases as the molding part 100 moves along the first direction DR1, the glass 10 that is molded by the molding part 100 may be prevented from being damaged, even though an intensity of the pressurization applied to the molding part 100 in the third direction DR3 by the pressure parts 300 is sequentially increased in accordance with the arrangement order of the pressure parts 300 along the first direction DR1.

In more detail, when the molding part 100 is disposed in the first region R1, the first pressure part 310 pressurizes the molding part 100 at a first pressure P1. The molding part 100 is pressurized by the first pressure part 310, and is transferred along the first direction DR1 to then be disposed in the second region R2.

The second pressure part 320 pressurizes the molding part 100 at a second pressure P2. The second pressure P2 is greater than the first pressure P1. The molding part 100 is pressurized by the second pressure part 320, and is then transferred along the first direction DR1 to be disposed in the third region R3.

The third pressure part 330 pressurizes the molding part 100 at a third pressure P3. The third pressure P3 is greater than the second pressure P2. The molding part 100 is pressurized by the third pressure part 330 and is transferred along the first direction DR1 to be disposed in the fourth region R4.

The fourth pressure part 340 pressurizes the molding part 100 at a fourth pressure P4. The fourth pressure P4 is greater than the third pressure P3.

The glass molding apparatus 1000 according to one or more exemplary embodiments may further include a plurality of heating blocks 400. The heating blocks 400 are disposed between the molding part 100 and the pressure parts 300 in the third direction DR3.

In more detail, the heating blocks 400 may include first, second, third, and fourth heating blocks 410, 420, 430, and 440. The first to fourth heating blocks 410, 420, 430, and 440 may respectively correspond to the first to fourth pressure parts 310, 320, 330, and 340.

The first to fourth heating blocks 410, 420, 430, and 440 apply heat to the molding part 100 (e.g., apply heat at a predetermined temperature). In more detail, each of the first to fourth heating blocks 410, 420, 430, and 440 may include a second heating member and a second power supply part. The heated temperature of the first to fourth heating blocks 410, 420, 430, and 440 increases in accordance with the arrangement order of the first to fourth heating blocks 410, 420, 430, and 440 along the first direction DR1. That is, the first heating block 410 is heated at the first temperature T1, and the second heating block 420 is heated at the second temperature T2. The third heating block 430 is heated at the third temperature T3, and the fourth heating block 440 is heated at the fourth temperature T4.

The molding process of the glass 10 heated and pressurized by the transfer roller part 210, the pressure parts 300, and the heating blocks 400 is completed through a cooling process (e.g., during a predetermined time).

According to one or more exemplary embodiments of the present disclosure, the transfer roller part 210 includes the transfer rollers 210-1 to 210-$n$, which transfer the molding part 100 along the first direction DR1. In addition, the transfer rollers 210-1 to 210-$n$ are heated at the temperatures T1 to T4 and apply the heat energy to the molding part 100. That is, the transfer roller part 210 of the glass molding apparatus 1000 according to one or more exemplary embodiments may be used instead of a conventional transfer device and a conventional heating device.

As such, the overall size of the glass molding apparatus 1000 according to one or more exemplary embodiments of the present invention may be significantly reduced, and the molding process may be simplified.

FIG. 2 is a front side view showing a glass molding apparatus 1000-1 according to one or more exemplary embodiments of the present disclosure. In FIG. 2, the same reference numerals denote the same elements as those in FIGS. 1A and 1B, and thus detailed descriptions of the same elements may be omitted.

Referring to FIG. 2, the glass molding apparatus 1000-1 according to one or more exemplary embodiments includes at least one molding part 100, a transfer roller part 210, and a plurality of pressure parts 300. That is, the heating blocks 400, described above, may be omitted from the glass molding apparatus 1000-1 according to one or more exemplary embodiments of the present disclosure.

The pressure parts 300 of the glass molding apparatus 1000-1 according to one or more exemplary embodiments are heated at predetermined temperatures T1 to T4. In more detail, each of pressure rollers 210-1 to 210-$n$ includes a second heating member and a second power supply part. In some exemplary embodiments, the second heating member and the second power supply part respectively have the same, or substantially the same, structure and function as the first heating member 221 and the first power supply part 222 described above, and thus details thereof may be omitted.

The pressure parts 300 according to one or more exemplary embodiments may be used instead of a pressure device and a heating device that are typically included in a conventional glass molding apparatus.

As such, the overall size of the glass molding apparatus 1000-1 according to one or more exemplary embodiments may be significantly reduced and the molding process may be simplified.

Figure 3A:
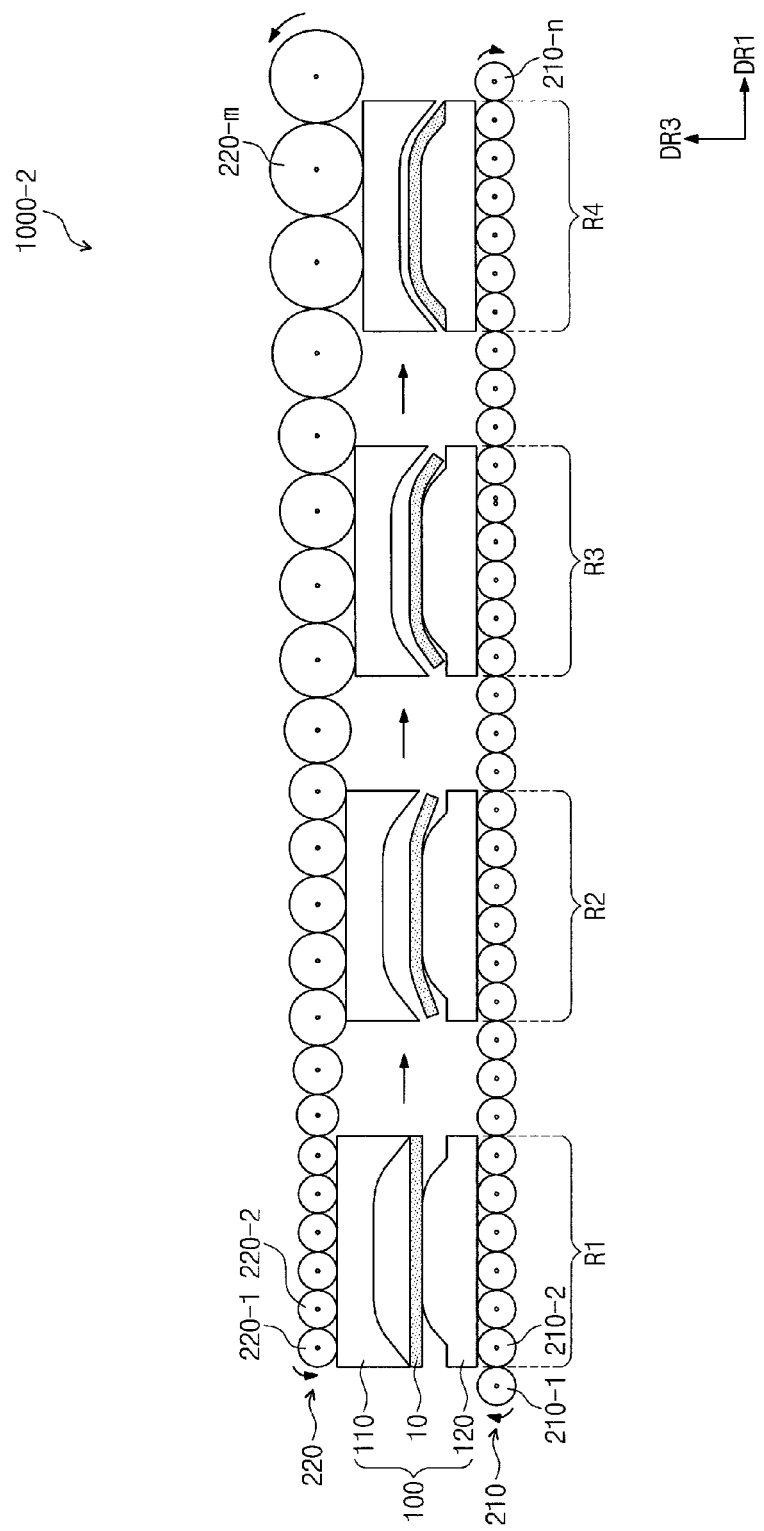
FIG. 3A is a front side view showing a glass molding apparatus according to one or more exemplary embodiments of the present disclosure.

FIG. 3A is a front side view showing a glass molding apparatus 1000-2 according to one or more exemplary embodiments of the present disclosure. In FIG. 3A, the same reference numerals denote the same elements in the above-mentioned embodiments, and thus detailed descriptions of the same elements may be omitted.

Referring to FIG. 3A, the glass molding apparatus 1000-2 includes at least one molding part 100, a transfer roller part 210, and a pressure roller part 220.

The pressure roller part 220 is disposed on the molding part 100. That is, the molding part 100 is disposed between the transfer roller part 210 and the pressure roller part 220 with respect to the third direction DR3. The pressure roller part 220 includes a plurality of pressure rollers 220-1 to 220-$m$. The pressure rollers 220-1 to 220-$m$ may include a carbon-based material.

The pressure rollers 220-1 to 220-$m$ are arranged along the first direction DR1. Each of the pressure rollers 220-1 to 220-$m$ has a roller shape and extends in the second direction DR2.

Each of the pressure rollers 220-1 to 220-$m$ rotates in a direction opposite to a rotation direction of the transfer rollers 210-1 to 210-$n$. As illustrated in FIG. 3A, the transfer rollers 210-1 to 210-$n$ may rotate in a clockwise direction and the pressure rollers 220-1 to 220-$m$ may rotate in a counter-clockwise direction.

Due to the rotation of the transfer rollers 220-1 to 220-$m$ and the pressure rollers 220-1 to 220-$m$, the molding part 100 disposed between the transfer roller part 210 and the pressure roller part 220 is transferred along the first direction DR1.

The pressure roller part 220 pressurizes the molding part 100 in the third direction DR3. The intensity of pressurization applied to the molding part 100 by the pressure rollers 220-1 to 220-$m$ in the third direction DR3 increases in accordance with the arrangement order of the pressure rollers 220-1 to 220-$m$ in the first direction DR1.

For example, a radius of the pressure rollers 220-1 to 220-$m$ may increase in accordance with the arrangement order of the pressure rollers 220-1 to 220-$m$ in the first direction DR1. As the radius of the pressure rollers 220-1 to 220-$m$ increases, the intensity of the pressurization applied to the molding part 100 in the third direction DR3 by the pressure rollers 220-1 to 220-$m$ increases.

The pressure roller part 220 applies heat to the molding part 100 (e.g., applies heat at a predetermined temperature).

In more detail, each of the pressure rollers 220-1 to 220-$m$ may include a third heating member and a third power supply part. In some exemplary embodiments, the third heating member and the third power supply part respectively have the same, or substantially the same, structure and function as those of the first heating member 221 and the first power supply part 222 described above, and thus, details thereof may be omitted.

As described above, the heated temperature of the pressure rollers 220-1 to 220-$m$ increases with the arrangement order of the pressure rollers 220-1 to 220-$m$ in the first direction DR1. That is, because the molding part 100 is heated at a temperature which becomes higher as the molding part 100 moves along the first direction DR1, the glass 10 may be prevented from being damaged, even though the intensity of the pressurization applied to the molding part 100 by the pressure parts 300 is increased.

According to one or more exemplary embodiments, the transfer roller part 210 includes the transfer rollers 210-1 to 210-$n$, and the pressure roller part 220 includes the pressure rollers 220-1 to 220-$m$. Therefore, the molding part 100 is transferred along the first direction DR1. In addition, the transfer rollers 210-1 to 210-$n$ and the pressure rollers 220-1 to 220-$m$, which are heated (e.g., are heated at the predetermined temperature), apply the heat energy to the molding part 100. Further, the pressure rollers 220-1 to 220-$m$, which have radiuses that increase in the arrangement order of the pressure rollers 220-1 to 220-$m$ in the first direction DR1, pressurize the molding part 100.

Thus, according to one or more exemplary embodiments, the pressure roller part 220 may replace the pressure parts 300 described above with reference to FIGS. 1A, 1B, and 2.

As such, the overall size of the glass molding apparatus 1000-2 according to one or more exemplary embodiments may be significantly reduced and the molding process may be simplified.

Figure 3B:
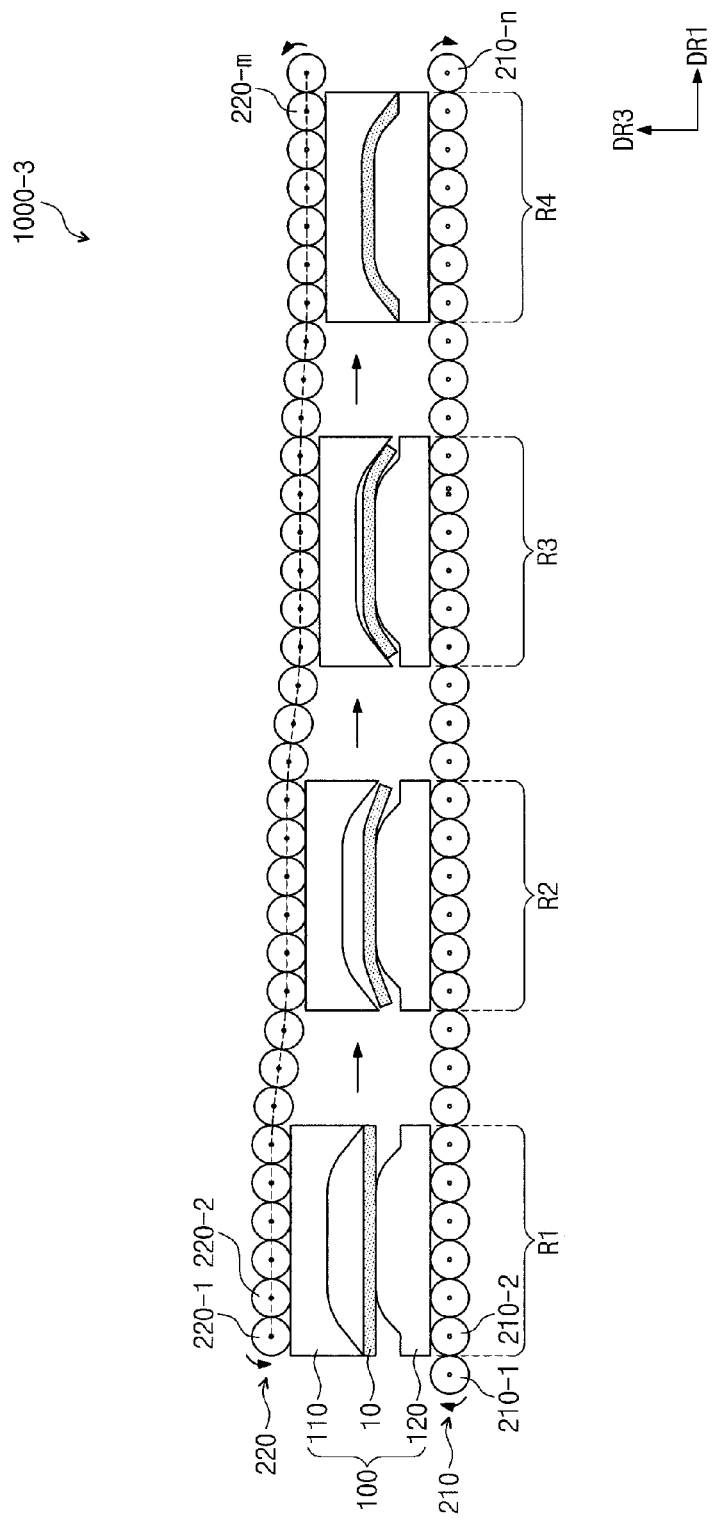
FIG. 3B is a front side view showing a glass molding apparatus according to one or more exemplary embodiments of the present disclosure.

FIG. 3B is a front side view showing a glass molding apparatus 1000-3 according to one or more exemplary embodiments of the present disclosure. In FIG. 3B, the same reference numerals denote the same elements in the above-mentioned embodiments, and thus detailed descriptions of the same elements may be omitted.

Referring to FIG. 3B, a rotation axis of pressure rollers 220-1 to 220-$m$ of the glass molding apparatus 1000-3 is increasingly closer to a rotation axis of a corresponding one of the transfer rollers 210-1 to 210-$n$ in the arrangement order of the rollers 210-1 to 210-$n$ and 220-1 to 220-$m$ along the first direction DR1.

For example, a distance between the rotation axis of the pressure rollers 220-1 to 220-$m$ and the rotation axis of a respective one of the transfer rollers 210-1 to 210-$n$ in the third direction DR3 may progressively decrease in the arrangement order of the pressure rollers 210-1 to 210-$m$ along the first direction DR1. As such, the pressure rollers 220-1 to 220-$m$ may have a constant radius (e.g., the pressure rollers 220-1 to 220-$m$ may each have the same radius), and alignment of the transfer rollers 210-1 to 210-$n$ in the third direction DR3 may be constant. As a distance between the rotation axis of the pressure rollers 220-1 to 220-$m$ and the rotation axis of the transfer rollers 210-1 to 210-$n$ in the third direction DR3 decreases, the intensity of the pressurization applied to the molding part 100 by the pressure rollers 220-1 to 220-$m$ along the third direction DR3 increases.

Accordingly, the pressure roller part 220 according to one or more exemplary embodiments may replace the pressure parts 300 described above with reference to FIGS. 1A, 1B, and 2.

As such, the overall size of the glass molding apparatus 1000-3 according to one or more exemplary embodiments may be significantly reduced and the molding process may be simplified.

Figure 4:
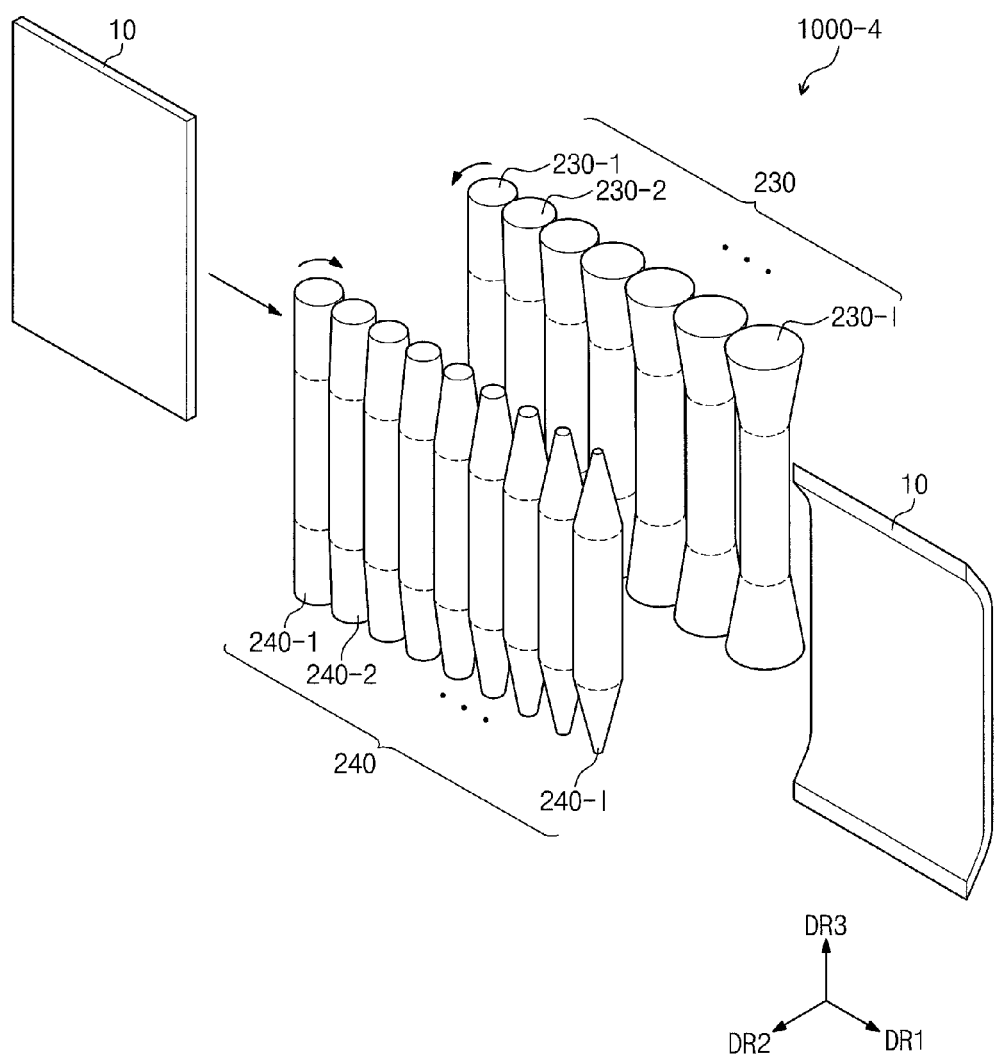
FIG. 4 is a perspective view showing a glass molding apparatus according to one or more exemplary embodiments of the present disclosure.

FIG. 4 is a perspective view showing a glass molding apparatus 1000-4 according to one or more exemplary embodiments of the present disclosure. In FIG. 4, the same reference numerals denote the same elements in the above-mentioned embodiments, and thus detailed descriptions of the same elements may be omitted.

Referring to FIG. 4, the glass molding apparatus 1000-4 according to one or more exemplary embodiments includes a first upper surface molding part 230 and a first lower surface molding part 240. The first upper surface molding part 230 and the first lower surface molding part 240 face each other in the second direction DR2. The glass 10 is between the first upper surface molding part 230 and the first lower surface molding part 240. In more detail, an upper surface of the glass 10 contacts an inner side of the first upper surface molding part 230, and a lower surface of the glass 10 contacts the first lower surface molding part 240.

The first upper surface molding part 230 includes a plurality of upper surface molding rollers 230-1 to 230-*l*, and the first lower surface molding part 240 includes a plurality of lower surface molding rollers 240-1 to 240-*l*. The upper surface molding rollers 230-1 to 230-*l* and the lower surface molding rollers 240-1 to 240-*l* extend in the third direction DR3, and are arranged along the first direction DR1. Each of the upper surface molding rollers 230-1 to 230-*l* corresponds to a respective one of the lower surface molding rollers 240-1 to 240-*l*.

The upper surface molding rollers 230-1 to 230-*l* rotate in a direction that is different from a rotation direction of the lower surface molding rollers 240-1 to 240-*l*. As illustrated in FIG. 4, in some embodiments, the upper surface molding rollers 230-1 to 230-*l* may rotate in a counter-clockwise direction, and the lower surface molding rollers 240-1 to 240-*l* may rotate in a clockwise direction.

Due to the rotation of the upper surface molding rollers 230-1 to 230-*l* and the lower surface molding rollers 240-1 to 240-*l*, the glass 10 between the upper surface molding rollers 230-1 to 230-*l* and the lower surface molding rollers 240-1 to 240-*l* is transferred along the first direction DR1.

Figure 5A:
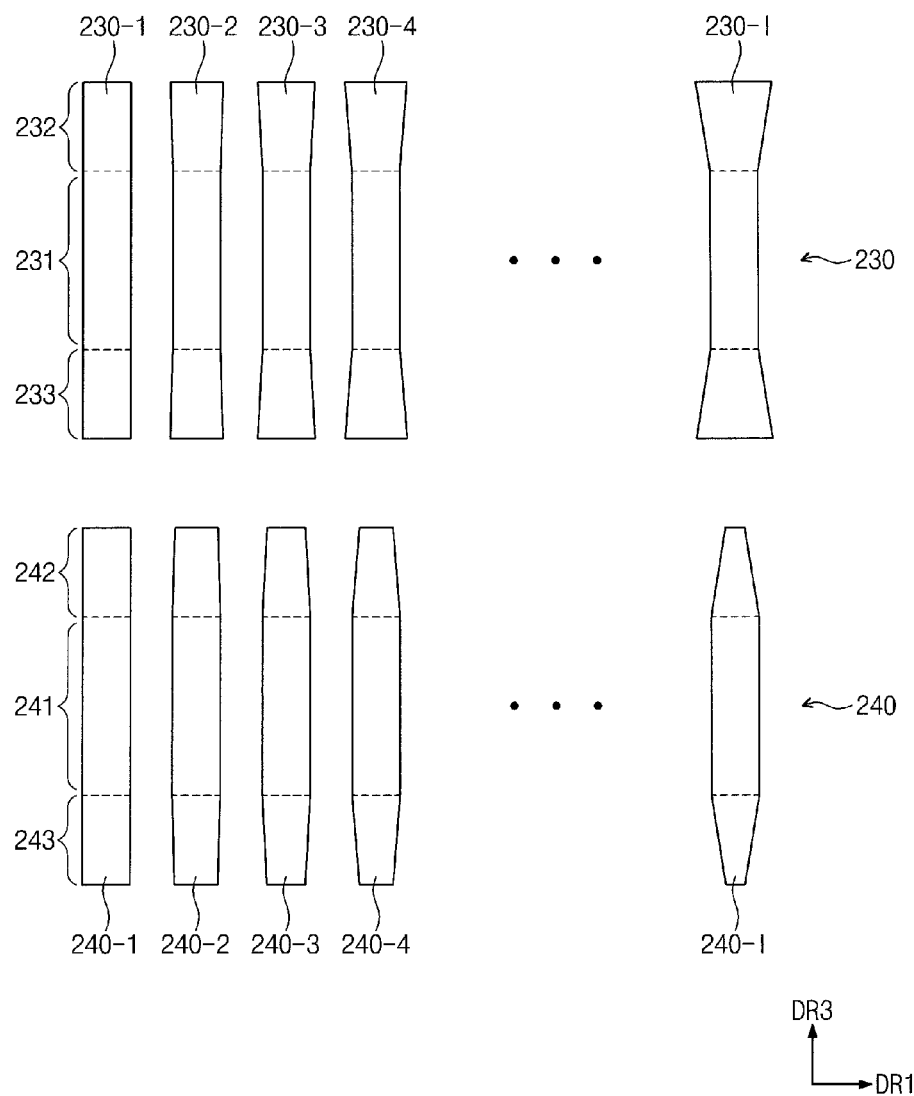
FIG. 5A is a front side view showing an upper surface molding part and a lower surface molding part of the glass molding apparatus shown in FIG. 4.

FIG. 5A is a front side view showing the first upper surface molding part 230 and the first lower surface molding part 240 shown in FIG. 4, and FIG. 5B is a side surface view showing the glass molding apparatus 1000-4 shown in FIG. 4.

Referring to FIGS. 5A and 5B, each of the upper surface molding rollers 230-1 to 230-*l* may include a first plane surface molding part 231, and two first curved surface molding parts 232 and 233. The first curved surface molding parts 232 and 233 are at opposing ends of the respective first plane surface molding part 231 in the third direction DR3.

Each of the lower surface molding rollers 240-1 to 240-*l* may include a second plane surface molding part 241, and two second curved surface molding parts 242 and 243. The second curved surface molding parts 242 and 243 are at opposing ends of the respective second plane surface molding part 241 in the third direction DR3.

In some exemplary embodiments, the first upper surface molding part 230 and the first lower surface molding part 240 may respectively include two first curved surface molding parts 232 and 233 and two second curved surface molding parts 242 and 243, but the number of the first curved surface molding parts 232 and 233 and the second curved surface molding parts 242 and 243 is not limited thereto. For example, in other embodiments, one of the first curved surface molding parts 232 and 233 may be disposed at one end of the first plane surface molding part 231, and one of the second curved surface molding parts 242 and 243 may be disposed at one end of the second plane surface molding part 241. The glass 10 is molded by the first upper surface molding part 230 and the first lower surface molding part 240. In the present embodiment, as the glass 10 is transferred along the first direction DR1, the glass 10 is molded (e.g., is curved at both ends) in the third direction DR3 by the first and second curved surface molding parts 232, 233, 242, and 243.

In more detail, each of the first curved surface molding parts 232 and 233 has a radius that increases according to the arrangement order of the upper surface molding rollers 230-1 to 230-*l* in the first direction DR1. Each of the second curved surface molding parts 242 and 243 has a radius that decreases according to the arrangement order of the lower surface molding rollers 240-1 to 240-*l* in the first direction DR1.

In addition, the radius of the first curved surface molding parts 232 and 233 gradually increases as a distance from a respective end of each of the upper surface molding rollers 230-1 to 230-*l* in the third direction DR3 decreases. The radius of the second curved surface molding parts 242 and 243 gradually decreases as a distance from a respective end of each of the lower surface molding rollers 240-1 to 240-*l* in the third direction DR3 decreases.

Accordingly, as the glass 10 is transferred along the first direction DR1, a curvature of regions corresponding to both ends of the glass 10 disposed between the first upper surface molding part 230 and the first lower surface molding part 240 increases by the first curved surface molding parts 232 and 233 and the second curved surface molding parts 242 and 243.

The first upper surface molding part 230 and the first lower surface molding part 240 may be heated (e.g., may be heated at a predetermined temperature).

In more detail, each of the upper surface molding rollers 230-1 to 230-*l* and each of the lower surface molding rollers 240-1 to 240-*l* may include a fourth heating member and a fourth power supply part. The fourth heating member and the fourth power supply part may respectively have the same or substantially the same structure and function as those of the first heating member 221 and the first power supply part 222, which are described above, and thus, details thereof may be omitted.

The heated temperature of the upper surface molding rollers 230-1 to 230-*l* and the lower surface molding rollers 240-1 to 240-*l* is increased according to the arrangement order of the upper surface molding rollers 230-1 to 230-*l* and the lower surface molding rollers 240-1 to 240-*l* along the first direction DR1. That is, because the glass 10 is heated to varying temperatures, which increase as the glass 10 is transferred along the first direction DR1, the glass 10 may be prevented from being damaged even though the curvature of the both ends of the glass 10 increases due to the first curved surface molding parts 232 and 233 and the second curved surface molding parts 242 and 243.

According to one or more exemplary embodiments of the present disclosure, the glass 10 is transferred along the first direction DR1 between the first upper surface molding part 230 and the first lower surface molding part 240. In addition, because the radius of the first curved surface molding parts 232 and 233 and the second curved surface molding parts 242 and 243 changes according to the arrangement order of the upper surface molding rollers 230-1 to 230-*l* and the lower surface molding rollers 240-1 to 240-*l* along the first direction DR1, the regions corresponding to the ends of the glass 10 may be curved in the third direction DR3.

In addition, the upper surface molding rollers 230-1 to 230-*l* and the lower surface molding rollers 240-1 to 240-*l* are heated (e.g., are heated at the predetermined temperature) and apply the heat energy to the glass 10.

Therefore, the first upper surface molding part 230 and the first lower surface molding part 240 according to one or more exemplary embodiments may replace a transfer device, a heating device, a molding part, and a pressure device typically included in a conventional glass molding apparatus.

As such, the overall size of the glass molding apparatus 1000-4 according to one or more exemplary embodiments may be significantly reduced, and the molding process may be simplified.

Figure 6:
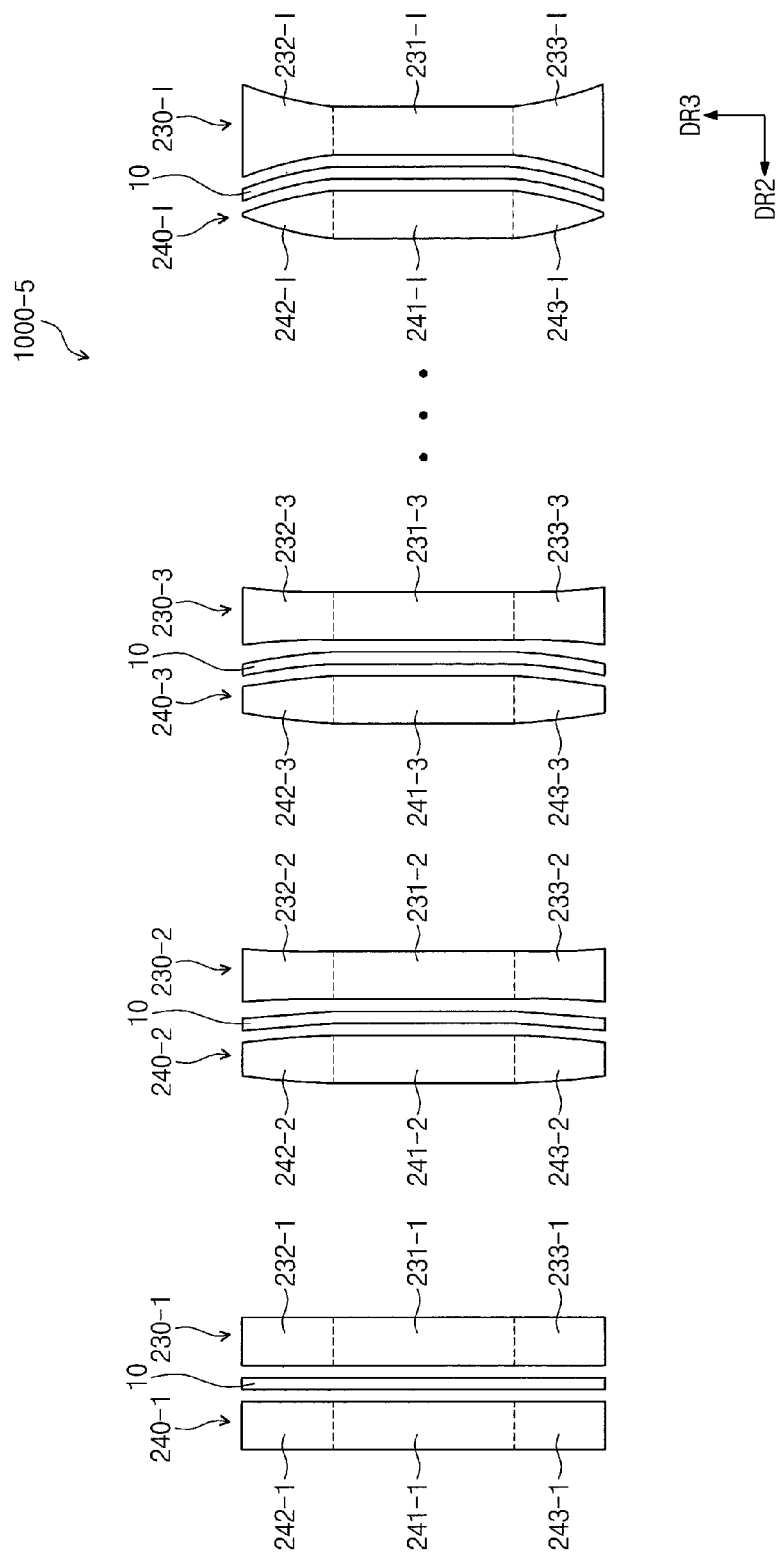
FIG. 6 is a side view showing portions of a glass molding apparatus according to one or more exemplary embodiments of the present disclosure.

FIG. 6 is a side surface view showing a glass molding apparatus 1000-5 according to one or more exemplary embodiments of the present disclosure.

In FIG. 6, the same reference numerals denote the same elements in the above-mentioned embodiments, and thus detailed descriptions of the same elements may be omitted.

Referring to FIG. 6, each of first curved surface molding parts 232-1 to 232-*l* and 233-1 to 233-*l* and each of second curved surface molding parts 242-1 to 242-*l* and 243-1 to 243-*l* may have a curved surface shape. In more detail, each of the first curved surface molding parts 232-1 to 232-*l* and 233-1 to 233-*l* may have a concave curved surface shape, and each of the second curved surface molding parts 242-1 to 242-*l* and 243-1 to 243-*l* may have a convex curved surface shape. The concave curved surface shape of each of the first curved surface molding parts 232-1 to 232-*l* and 233-1 to 233-*l* respectively corresponds to the convex curved surface shape of each of the second curved surface molding parts 242-1 to 242-*l* and 243-1 to 243-*l*.

The glass 10 molded by the glass molding apparatus 1000-5 may have a more smooth curvature than that of the glass 10 molded by the glass molding apparatus 1000-4 described above.

Figure 7:
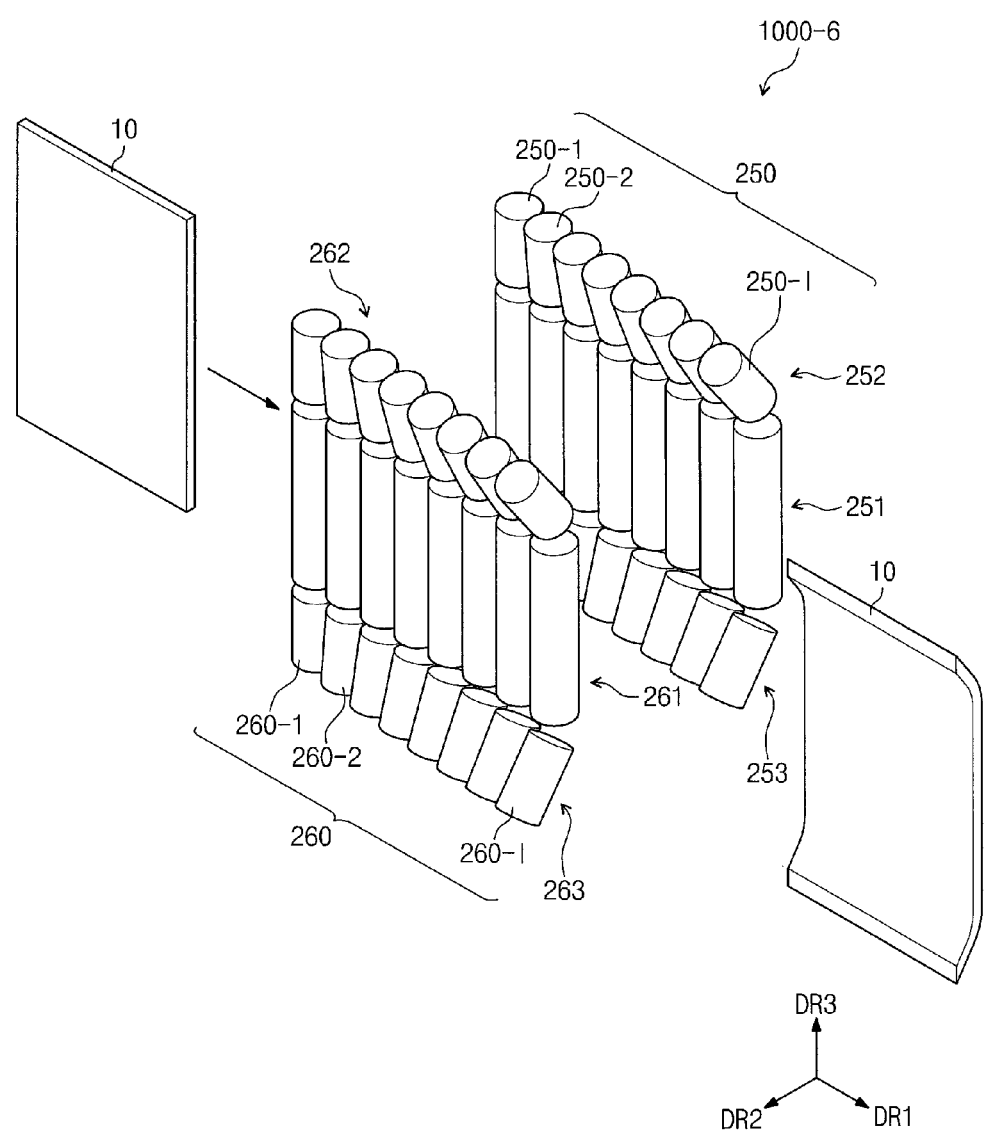
FIG. 7 is a perspective view showing a glass molding apparatus according to one or more exemplary embodiments of the present disclosure.

FIG. 7 is a perspective view showing a glass molding apparatus 1000-6 according to one or more exemplary embodiments of the present disclosure.

In FIG. 7, the same reference numerals denote the same elements in the above-mentioned embodiments, and thus detailed descriptions of the same elements may be omitted.

Referring to FIG. 7, the glass molding apparatus 1000-6 according to one or more exemplary embodiments includes a second upper surface molding part 250 and a second lower surface molding part 260. The second upper surface molding part 250 and the second lower surface molding part 260 face each other in the second direction DR2. The glass 10 is between the second upper surface molding part 250 and the second lower surface molding part 260. In more detail, an upper surface of the glass 10 contacts an inner side of the second upper surface molding part 250, and a lower surface of the glass 10 contacts the second lower surface molding part 260.

The second upper surface molding part 250 includes a plurality of upper surface molding rollers 250-1 to 250-*l*, and the second lower surface molding part 260 includes a plurality of lower surface molding rollers 260-1 to 260-*l*. The upper surface molding rollers 250-1 to 250-*l* and the lower surface molding rollers 260-1 to 260-*l* are arranged along the first direction DR1. Each of the upper surface molding rollers 250-1 to 250-*l* respectively correspond to one of the lower surface molding rollers 260-1 to 260-*l* in a one-to-one correspondence.

The upper surface molding rollers 250-1 to 250-*l* rotate in a direction that is different from a rotation direction of the lower surface molding rollers 260-1 to 260-*l*. As illustrated in FIG. 7, in some embodiments, the upper surface molding rollers 250-1 to 250-*l* may rotate in a counter-clockwise direction, and the lower surface molding rollers 260-1 to 260-*l* may rotate in a clockwise direction.

Due to the rotation of the upper surface molding rollers 250-1 to 250-*l* and the lower surface molding rollers 260-1 to 260-*l*, the glass 10 between the upper surface molding rollers 250-1 to 250-*l* and the lower surface molding rollers 260-1 to 260-*l* is transferred along the first direction DR1.

Figure 8:
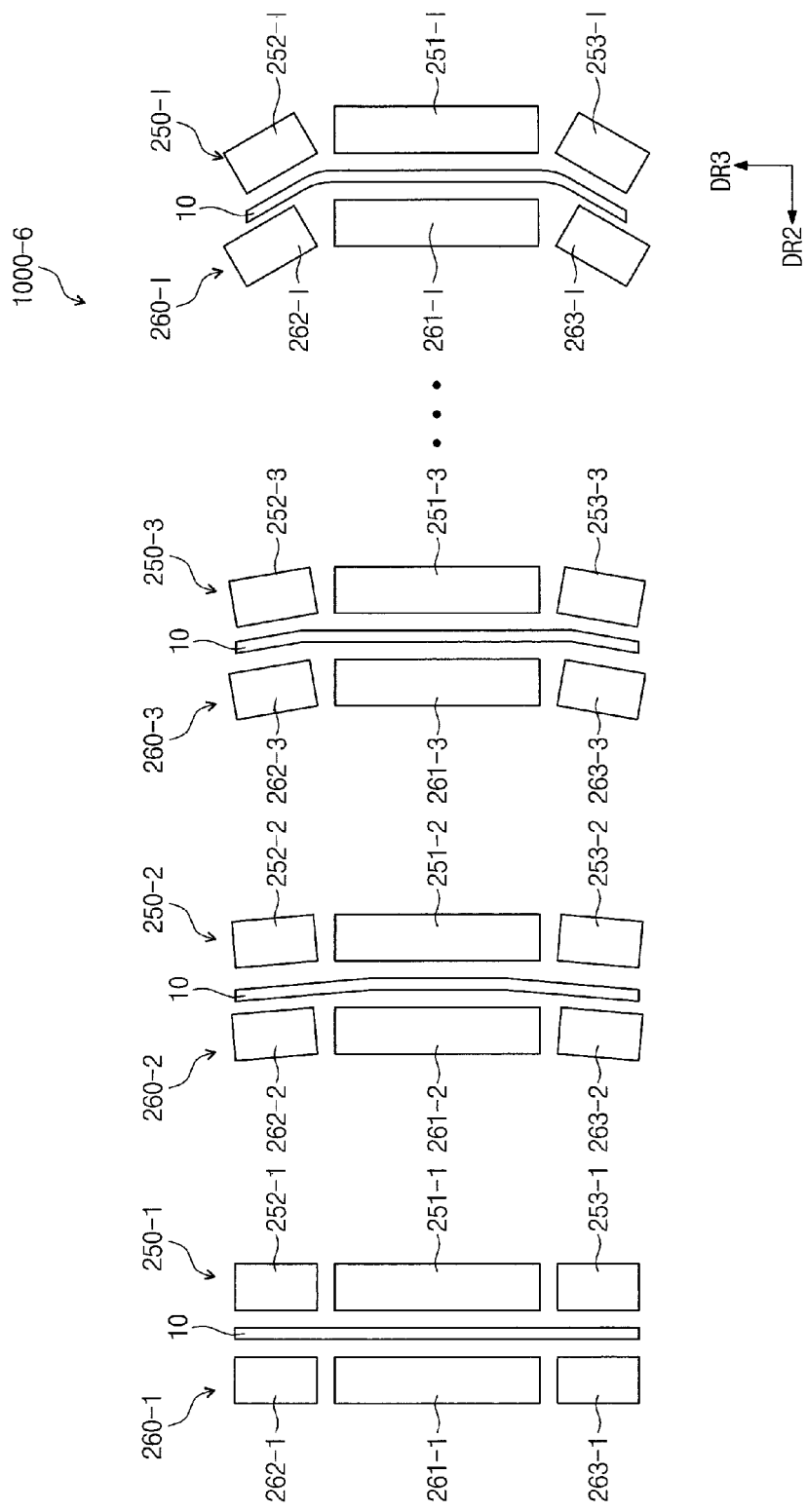
FIG. 8 is a side view showing portions of the glass molding apparatus shown in FIG. 7.

FIG. 8 is a side surface view showing the glass molding apparatus 1000-6 shown in FIG. 7.

Referring to FIGS. 7 and 8, each of the upper surface molding rollers 250-1 to 250-*l* includes a first roller 251 and two second rollers 252 and 253. The second rollers 252 and 253 are respectively at opposing ends of the first roller 251 in the third direction DR3 in a one-to-one correspondence.

Each of the lower surface molding rollers 260-1 to 260-*l* includes a third roller 261 and two fourth rollers 262 and 263. The fourth rollers 262 and 263 are respectively at opposing ends of the second roller 261 in the third direction DR3 in a one-to-one correspondence.

In some exemplary embodiments, the second upper surface molding part 250 and the second lower surface molding part 260 may respectively include two second rollers 252 and 253 and two fourth rollers 262 and 263, but the number of each of the second and fourth rollers 252, 253, 262, and 263 should not be limited thereto. For example, according to other embodiments, one of the second rollers 252 and 253 may be disposed at one end of the first roller 251, and one of the fourth rollers 262 and 263 may be disposed at one end of the third roller 261. For example, one of the second rollers 252 and 253, and/or one of the fourth rollers 262 and 263 may be omitted.

The glass 10 is molded by the second upper surface molding part 250 and the second lower surface molding part 260. As the glass 10 is transferred along the first direction DR1, regions corresponding to both ends of the glass 10 in the third direction DR3 may have a curved surface shape by the second rollers 252 and 253 and the fourth rollers 262 and 263.

In more detail, the first roller 251 has a rotation axis extending in the third direction DR3. The second rollers 252 and 253 have rotation axes symmetrical to each other about a plane surface defined by the first and second directions DR1 and DR2. That is, the second rollers 252 and 253 may be angled from the direction in which the first roller 251 extends.

The third roller 261 has a rotation axis extending in the third direction DR3. The fourth rollers 262 and 263 have rotation axes symmetrical to each other about a plane surface defined by the first and second directions DR1 and DR2. That is, the fourth rollers 262 and 263 may be angled from the direction in which the first roller 261 extends.

The rotation axis of each of the second and fourth rollers 252, 253, 262, and 263 has a slope that gradually increases with respect to the third direction DR3 in accordance with the arrangement order of the upper surface molding rollers 250-1 to 250-*l* and the lower surface molding rollers 260-1 to 260-*l* along the first direction DR1.

Thus, as the glass 10 is transferred along the first direction DR1, the curvature of the regions corresponding to both ends of the glass 10 between the upper surface molding rollers 250-1 to 250-*l* and the lower surface molding rollers 260-1 to 260-*l* may be increased.

The second upper surface molding part 250 and the second lower surface molding part 260 may be heated (e.g., may be heated at a predetermined temperature).

In more detail, each of the upper surface molding rollers 250-1 to 250-*l* and each of the lower surface molding rollers 260-1 to 260-*l* may include a fifth heating member and a fifth power supply part. The fifth heating member and the fifth power supply part may respectively have the same, or substantially the same, structure and function as the first heating member 221 and the first power supply part 222, which are described above, and thus details thereof may be omitted.

The heated temperature of the upper surface molding rollers 250-1 to 250-*l* and the lower surface molding rollers 260-1 to 260-*l* increases according to the arrangement order of the upper surface molding rollers 250-1 to 250-*l* and the lower surface molding rollers 260-1 to 260-*l* along the first direction DR1. That is, because the glass 10 is heated at the temperature, which becomes higher as the glass 10 is transferred along the first direction DR1, a fluidity of the glass 10 increases (e.g., the glass 10 becomes more easily molded). Accordingly, the glass 10 may be prevented from being damaged even though the curvature of the both ends of the glass 10 increases due to the second rollers 252 and 253 and the fourth rollers 262 and 263.

According to one or more exemplary embodiments of the present disclosure, the glass 10 is transferred along the first direction DR1 between the second upper surface molding part 250 and the second lower surface molding part 260. In addition, because the slope of the rotation axis of the second rollers 252 and 253 and the fourth rollers 262 and 263 with respect to the third direction DR3 increases in the first direction DR1 according to the arrangement order of the upper surface molding rollers 250-1 to 250-*l* and the lower surface molding rollers 260-1 to 260-*l*, the regions corresponding to the both ends of the glass 10 may have the curvature in the third direction DR3.

In addition, the upper surface molding rollers 250-1 to 250-*l* and the lower surface molding rollers 260-1 to 260-*l* are heated (e.g., are heated at the predetermined temperature) and apply the heat energy to the glass 10.

Therefore, the second upper surface molding part 250 and the second lower surface molding part 260 of the glass molding apparatus 1000-6 according to one or more exemplary embodiments may be used to replace a transfer device, a heating device, a molding part, and a pressure device typically included in a conventional glass molding apparatus.

As such, the overall size of the glass molding apparatus 1000-6 according to one or more exemplary embodiments may be significantly reduced and the molding process may be simplified.

FIG. 9 is a side surface view showing a glass molding apparatus 1000-7 according to one or more exemplary embodiments of the present disclosure.

In FIG. 9, the same reference numerals denote the same elements in the above-mentioned embodiments, and thus detailed descriptions of the same elements may be omitted.

Referring to FIG. 9, each of the second rollers 252-1 to 252-*l* and 253-1 to 253-*l* and each of the fourth rollers 262-1 to 262-*l* and 263-1 to 263-*l* may have a curved surface shape. In more detail, each of the second rollers 252-1 to 252-*l* and 253-1 to 253-*l* may have a concave curved surface shape, and each of the fourth rollers 262-1 to 262-*l* and 263-1 to 263-*l* may have a convex curved surface shape. The concave curved surface shape of each of the second rollers 252-1 to 252-*l* and 253-1 to 253-*l* corresponds to the convex curved surface shape of each of the fourth rollers 262-1 to 262-*l* and 263-1 to 263-*l*.

The glass 10 molded by the glass molding apparatus 1000-7 according to one or more exemplary embodiments may have a curvature that is smoother than that of the glass 10 molded by the glass molding apparatus 1000-6 according to one or more exemplary embodiments described above.

Figure 10A:
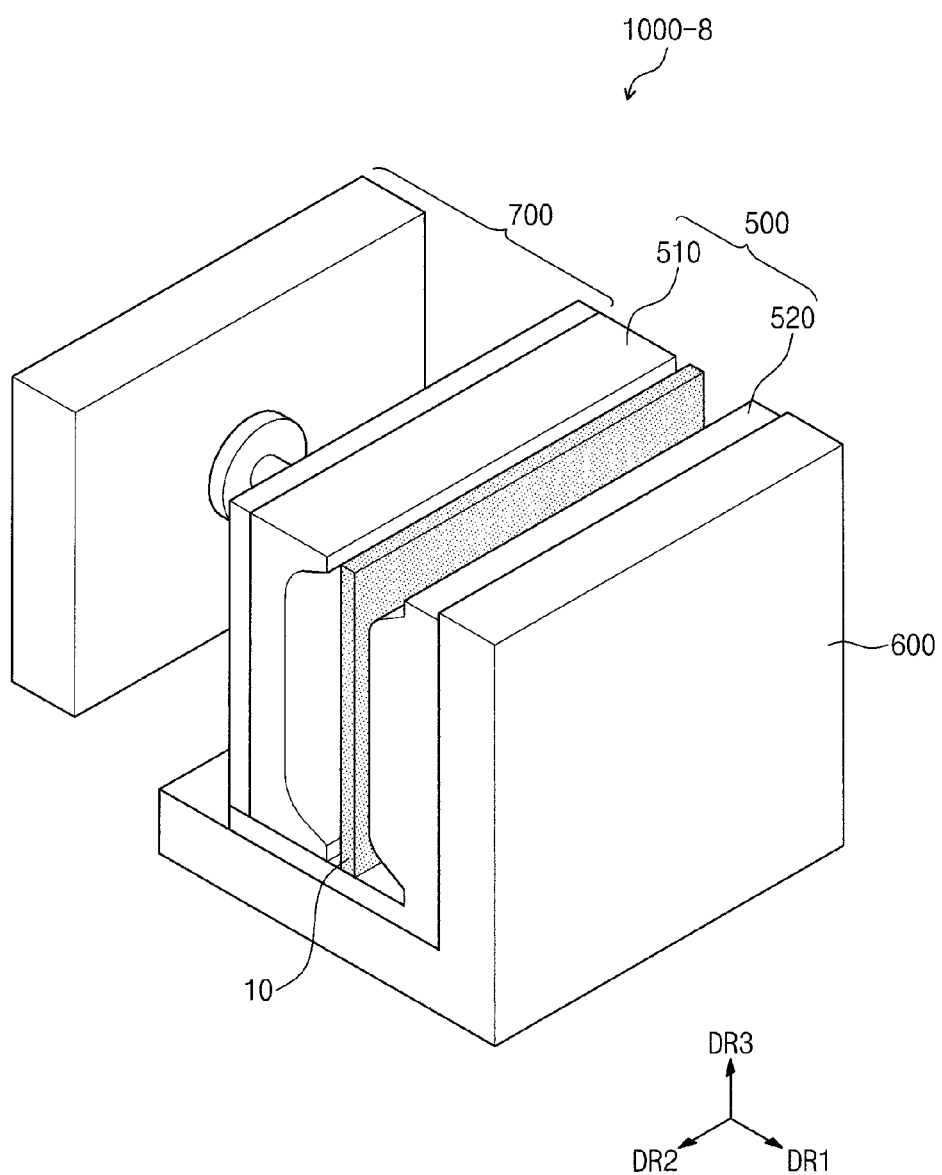
FIG. 10A is a perspective view showing a glass molding apparatus according to one or more exemplary embodiments of the present disclosure.
Figure 10B:
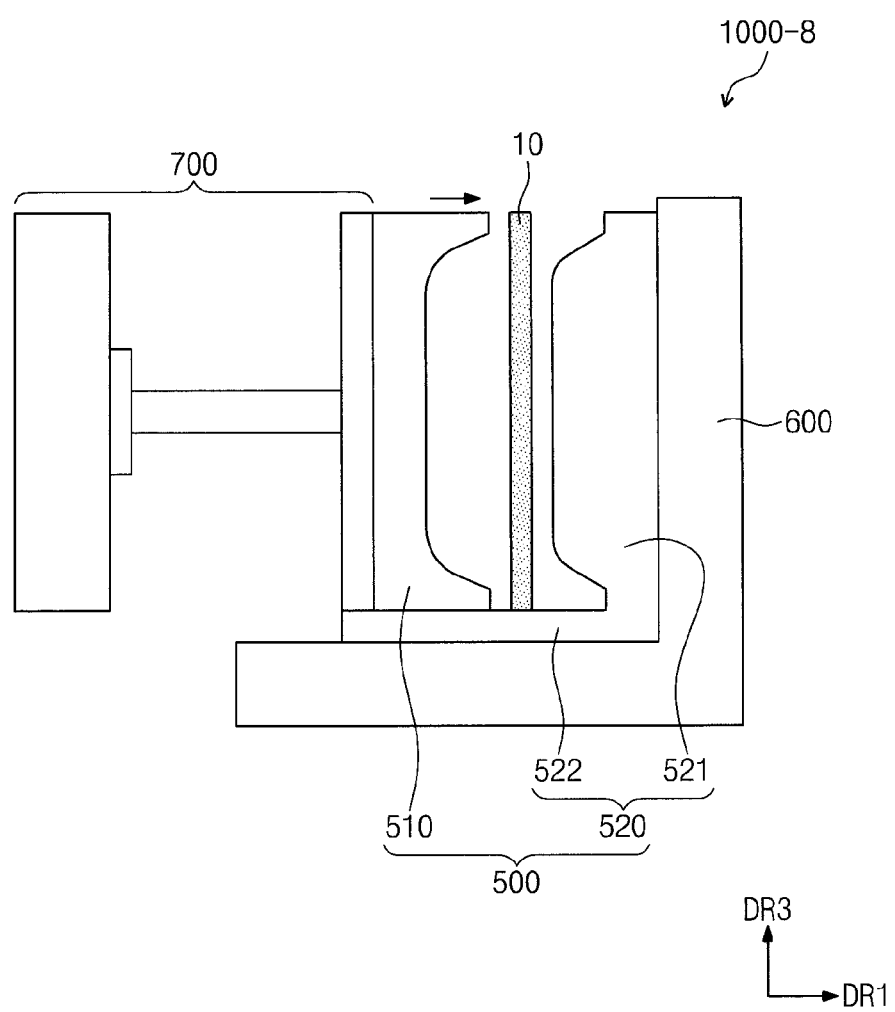
FIG. 10B is a front elevational view showing the glass molding apparatus shown in FIG. 10A.

FIG. 10A is a perspective view showing a glass molding apparatus 1000-8 according to one or more exemplary embodiments of the present disclosure and FIG. 10B is a front surface view showing the glass molding apparatus 1000-8 shown in FIG. 10A.

Referring to FIGS. 10A and 10B, the glass molding apparatus 1000-8 according to one or more exemplary embodiments includes a molding part 500, a supporting part 600, and a pressure part 700.

The molding part 500 is a molding cast having a shape corresponding to that of a glass 10 that is molded. The molding part 500 includes a first molding cast (e.g., an upper molding cast) 510 and a second molding cast (e.g., a lower molding cast) 520. The molding part 500 may be a metal mold. In more detail, the upper molding cast 510 may be an upper metal mold, and the lower molding cast 520 may be a lower metal mold.

In some embodiments, the molding part 500 may include a metal material, but the present invention is not limited thereto or thereby. For example, the molding part 500 may include various materials, e.g., ceramic, silicon carbide (SiC), tungsten carbide (WC), etc.

The upper molding cast 510 and the lower molding cast 520 face each other. The glass 10 is substantially parallel to a plane surface defined by the second and third directions DR2 and DR3. For example, the glass 10 may be between the upper molding cast 510 and the lower molding cast 520. In more detail, an upper surface of the glass 10 may contact the upper molding cast 510 and a lower surface of the glass 10 may contact the lower molding cast 520.

The upper molding cast 510 is substantially parallel to a plane surface defined by the second and third directions DR2 and DR3. A first surface of the upper molding cast 510 contacts the pressure part 700, and a second surface of the upper molding cast 510 contacts the upper surface of the glass 10 along the first direction DR1.

The lower molding cast 520 includes a first extension part 521 and a second extension part 522. The first extension part 521 is substantially parallel to the plane surface defined by the second and third directions DR2 and DR3. A first surface of the first extension part 521 contacts the lower surface of the glass 10, and a second surface of the first extension part 521 contacts a first surface of the supporting part 600 along the first direction DR1.

The second extension part 522 is connected to a lower end of the first extension part 521 in the third direction DR3, and is substantially parallel to a plane defined by the first and second directions DR1 and DR2. A first surface of the second extension part 522 is connected to a second surface of the supporting part 600, and the glass 10 and the upper molding cast 521 are disposed on a second surface of the second extension part 522 along the third direction DR3.

The second extension part 522 of the lower molding cast 520 contacts a side surface of the upper molding cast 510 in the third direction DR3. The upper molding cast 510 contacts the second surface of the second extension part 522, and travels back and forth along the first direction DR1.

In some embodiments, a recess may be formed in the second surface of the second extension part 522, and a protrusion may be formed on the side surface of the upper molding cast 510 in the third direction DR3. The recess of the second extension part 522 may have a shape that corresponds to the protrusion of the upper molding cast 510, and thus the protrusion may engage with the recess. Accordingly, the upper molding cast 510 may slide along the second surface of the second extension part 522 along the first direction DR1.

The supporting part 600 partially surrounds the first and second extension parts 521 and 522 (e.g., surrounds a predetermined region of the first and second extension parts 521 and 522). In more detail, the supporting part 600 contacts the first surface of the first extension part 521 in the first direction DR1, and contacts the first surface of the second extension part 522 in the third direction DR3.

The supporting part 600 may be heated (e.g., may be heated at a predetermined temperature). The heated supporting part 600 applies the heat energy to the molding part 500.

The pressure part 700 is adjacent one side of the molding part 500 in the first direction DR1 to pressurize the molding part 500 in the first direction DR1.

According to one or more exemplary embodiments of the present disclosure, the upper molding cast 510 and the lower molding cast 520 of the molding part 100 may be integrally formed as a single (or unitary or individual) unit. In more detail, the upper molding cast 510 slides along the second surface of the second extension part 522 of the lower molding cast 520 to travel back and forth along the second surface of the second extension part 522. Accordingly, a device used to couple the upper molding cast 510 to the lower molding cast 520, or to separate the upper molding cast 510 from the lower molding cast 520, is not required.

As such, the overall size of the glass molding apparatus 1000-8 according to one or more exemplary embodiments may be significantly reduced, and the molding process may be simplified.

The above-mentioned disclosure is merely directed to embodiments of the present invention, and thus the present invention is not limited thereto. Further, it will be understood by those of ordinary skill in the art that various changes in form and details may be made therein without departing from the spirit and scope of the present invention as defined by the following claims and their equivalents.

What is claimed is:

1. A glass molding apparatus comprising:
    at least one molding part comprising a first molding cast and a second molding cast configured to mold a glass;
    a transfer roller part comprising a plurality of transfer rollers below the molding part, the transfer rollers being arranged along a first direction, being configured to rotate in a first rotation direction to transfer the molding part along the first direction, and being configured to apply heat to the molding part, wherein each of the transfer rollers comprises a first heating member generating the heat; and
    a plurality of pressure parts configured to apply pressure to the molding part,
    wherein the first heating member comprises a coil embedded in the respective transfer roller.

2. The glass molding apparatus of claim 1, wherein the first heating member further comprises
    a power supply part connected to the coil.

3. The glass molding apparatus of claim 1, wherein a temperature of the heat applied to the molding part by a respective one of the transfer rollers increases along the first direction.

4. The glass molding apparatus of claim 3, wherein an intensity of the pressure applied to the molding part by a respective one of the pressure parts increases along the first direction.

5. The glass molding apparatus of claim 4, wherein:
    the first molding cast comprises an upper molding cast configured to contact an upper portion of the glass; and
    the second molding cast comprises a lower molding cast configured to contact a lower portion of the glass,
    wherein the molding part is configured to produce glass in a molded configuration that comprises:
    a plane surface portion; and
    a curved surface portion at an end of the plane surface portion along the first direction.

6. The glass molding apparatus of claim 4, wherein the molding part is configured to be sequentially transferred to regions respectively corresponding to the pressure parts along the first direction, and
    wherein the pressure parts are configured to move along a third direction to apply pressure to the molding part, the third direction being substantially perpendicular to the first direction.

7. The glass molding apparatus of claim 6, wherein each of the pressure parts is configured to apply heat to the molding part.

8. The glass molding apparatus of claim 6, further comprising a heating block between the pressure parts and the molding part, the heating block being configured to apply heat to the molding part.

9. The glass molding apparatus of claim 3, wherein the pressure parts comprise a plurality of pressure rollers arranged along the first direction, the pressure rollers facing the transfer rollers such that the molding part is located between the transfer rollers and the pressure rollers, being configured to rotate in a second rotation direction opposite to the first rotation direction, and being configured to transfer the molding part along the first direction and to concurrently apply pressure to the molding part along a third direction substantially perpendicular to the first direction,
    wherein a distance between respective ones of the pressure rollers and the transfer rollers decreases in the first direction, and
    wherein the transfer rollers are configured to transfer the molding part along the first direction.

10. The glass molding apparatus of claim 3, wherein the pressure parts comprise a plurality of pressure rollers arranged along the first direction, the pressure rollers facing the transfer rollers such that the molding part is between the transfer rollers and the pressure rollers, being configured to rotate in a second rotation direction opposite to the first rotation direction, and being configured to transfer the molding part along the first direction and to concurrently apply pressure to the molding part along a third direction substantially perpendicular to the first direction,
    wherein radiuses of respective ones of the pressure rollers increase in the first direction, and
    wherein the transfer rollers are configured to transfer the molding part along the first direction.

11. The glass molding apparatus of claim 10, wherein the pressure rollers are configured to apply pressure to the molding part at increasing intensity as the molding part is transferred along the first direction.

12. The glass molding apparatus of claim 11, wherein each of the pressure rollers comprises a second heating member configured to apply heat to the molding part.

13. The glass molding apparatus of claim 12, wherein the transfer rollers and the pressure rollers are configured to apply heat to the molding part at increasing temperature along the first direction.

14. A glass molding apparatus comprising:
    an upper surface molding part comprising a plurality of upper surface molding rollers configured to contact an upper surface of a glass, the upper surface molding rollers being arranged along a first direction; and a lower surface molding part comprising a plurality of lower surface molding rollers configured to contact a lower surface of the glass, the lower surface molding rollers being arranged along the first direction and facing the upper surface molding part along a second direction that is substantially perpendicular to the first direction, wherein the upper surface molding rollers are configured to rotate in a first rotation direction, and the lower surface molding rollers are configured to rotate in a second rotation direction opposite to the first rotation direction, to transfer the glass along the first direction, wherein each of the upper surface molding rollers and each of the lower surface molding rollers comprises a heating member configured to generate heat, and wherein the upper surface molding rollers and the lower surface molding rollers are respectively configured to generate heat at increasing temperatures in the first direction.

15. The glass molding apparatus of claim 14, wherein each of the upper surface molding rollers comprises:

a first plane surface molding part extending along a third direction that is substantially perpendicular to the first and second directions; and a first curved surface molding part at an end of the first plane surface molding part, wherein each of the lower surface molding rollers comprises:

a second plane surface molding part extending along the third direction; and a second curved surface molding part at an end of the second plane surface molding part, wherein radiuses of respective ones of the first curved surface molding parts increase in the first direction, and wherein radiuses of respective ones of the second curved surface molding parts decrease in the first direction.

16. The glass molding apparatus of claim 15, wherein respective radiuses of each of the first curved surface molding parts of the upper surface molding rollers gradually increase toward an end of the upper surface molding rollers, and wherein respective radiuses of each of the second curved surface molding parts of the lower surface molding rollers gradually decrease toward an end of the lower surface molding rollers.

17. The glass molding apparatus of claim 16, wherein the first curved surface molding part has a concavely curved surface, and wherein the second curved surface molding part has a convexly curved surface.

18. The glass molding apparatus of claim 14, wherein each of the upper surface molding rollers comprises:

a first roller extending along a third direction that is substantially perpendicular to the first and second directions; and a second roller at an end of the first roller, wherein each of the lower surface molding rollers comprises:

a third roller extending in the third direction; and a fourth roller at an end of the third roller, and wherein a slope of a rotation axis of respective ones of the second and fourth rollers increases in the first direction.

19. The glass molding apparatus of claim 18, wherein the second roller has a concavely curved surface, and wherein the fourth roller has a convexly curved surface.

* * * * *